United States Patent
Chang et al.

(10) Patent No.: US 12,254,907 B2
(45) Date of Patent: Mar. 18, 2025

(54) DUAL LAYER GRADED CURIE TEMPERATURE HAMR MEDIA

(71) Applicant: Seagate Technology LLC, Fremont, CA (US)

(72) Inventors: Thomas Young Chang, Singapore (SG); Aneesh Venugopal, Edina, MN (US); Philip Lisle Steiner, Los Altos, CA (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

(21) Appl. No.: 18/592,111

(22) Filed: Feb. 29, 2024

(65) Prior Publication Data

US 2024/0331725 A1    Oct. 3, 2024

Related U.S. Application Data

(60) Provisional application No. 63/493,493, filed on Mar. 31, 2023.

(51) Int. Cl.
*G11B 5/31* (2006.01)
*G11B 5/66* (2006.01)
*G11B 5/00* (2006.01)

(52) U.S. Cl.
CPC .............. *G11B 5/3146* (2013.01); *G11B 5/66* (2013.01); *G11B 2005/0021* (2013.01)

(58) Field of Classification Search
None
See application file for complete search history.

(56) References Cited

U.S. PATENT DOCUMENTS

| | | | | |
|---|---|---|---|---|
| 5,604,046 | A | * | 2/1997 | Osato ................ G11B 11/10506 360/59 |
| 5,663,935 | A | * | 9/1997 | Nishimura ........ G11B 11/10521 |
| 5,666,346 | A | * | 9/1997 | Nishimura ........ G11B 11/10586 369/275.2 |
| 5,736,265 | A | * | 4/1998 | Tanaka .............. G11B 11/10586 |
| 6,027,825 | A | * | 2/2000 | Shiratori ........... G11B 11/10515 360/59 |
| 6,084,830 | A | * | 7/2000 | Ashinuma ........ G11B 20/10009 369/116 |
| 6,345,016 | B1 | * | 2/2002 | Shiratori ........... G11B 11/10515 369/13.52 |
| 9,047,880 | B1 | | 6/2015 | Bertero et al. |
| 9,984,709 | B1 | | 5/2018 | Huang et al. |
| 10,636,444 | B2 | | 4/2020 | Chang et al. |

(Continued)

OTHER PUBLICATIONS

Muthsam, et al., "Curie temperature modulated structure to improve the performance in heat assisted magnetic recording," Journal of Magnetism and Magnetic Materials, vol. 474, Mar. 15, 2019, pp. 442-447.

*Primary Examiner* — Peter Vincent Agustin

(57) ABSTRACT

An apparatus is configured to include a first magnetic layer, a second magnetic layer and a break layer between the first magnetic layer and the second magnetic layer. The first magnetic layer includes a Curie temperature gradient between a first surface and a second surface of the first magnetic layer. The second magnetic layer includes a Curie temperature gradient between a third surface and a fourth surface of the second magnetic layer. The first magnetic layer has an average Curie temperature that is higher than the second magnetic layer.

20 Claims, 11 Drawing Sheets

(56) References Cited

U.S. PATENT DOCUMENTS

| | | | |
|---|---|---|---|
| 11,626,134 B1 | 4/2023 | Chang et al. | |
| 11,626,136 B1* | 4/2023 | Chang | G11B 13/08 369/13.33 |
| 2006/0062132 A1* | 3/2006 | Van Kesteren | G11B 5/676 369/283 |
| 2007/0048552 A1* | 3/2007 | Soeya | G11B 5/676 369/13.41 |
| 2008/0084627 A1* | 4/2008 | Roshchin | G11B 11/10528 360/59 |
| 2011/0109984 A1* | 5/2011 | Jubert | G11B 5/02 |
| 2019/0027173 A1* | 1/2019 | Ding | G11B 5/02 |
| 2019/0122695 A1 | 4/2019 | Chang et al. | |

* cited by examiner

DUAL LAYER GRADED CURIE TEMPERATURE HAMR MEDIA

This application claims priority to U.S. Provisional Patent Application Ser. No. 63/493,493, entitled "DUAL LAYER GRADED CURIE TEMPERATURE HAMR MEDIA" and filed Mar. 31, 2023, the entire contents of which are hereby incorporated by reference.

BACKGROUND

Conventional magnetic media encode magnetic bits with positive and negative polarity to store data corresponding to the two distinct binary states (1 and 0). However, other types of media, such as flash, can utilize multi-level cells to encode more than two logical states. For example, a 2-level multi-level flash cell may be programmed to store four different logical states corresponding to the programmed pairs of values [1, 0], [0,0], [1, 1], and [0,1], which radically improves storage densities as compared to single-level cells that store only a 1 or a 0. In magnetic storage devices, it is theorized that areal storage density capacity (ADC) could be improved by as much as 58% if a magnetic media could be used to store 3 distinct logical states (e.g., −1, 1, and 0).

Although some approaches to tri-state magnetic recording have been previously proposed, existing solutions have significant shortcomings. One existing approach utilizes a single-layer recording media and encodes a zero-polarity state by performing what is known as AC erase. Per this approach, 1 and −1 are encoded by magnetizing bits with positive and negative polarity while the zero state is created by rapidly pulsing the write current between positive and negative polarity within a single bit such that about half the magnetic grains in the bit are positively magnetized and about half are negatively magnetized leading to a net bit magnetization of approximately zero. Current implementations of this approach suffer from noise that is high enough that net ADC gains have not yet been realized.

Another existing approach to tri-state magnetic recording utilizes a single-pass write process that facilitates recording of data bits of three logical states on a single pass of a write element over an underlying data track. The three logical states include a "zero-state" that is characterized by stacked layers of opposing polarity such that the net magnetization of the individual grains that form the zero-state data bit is substantially zero.

SUMMARY

The present disclosure describes an apparatus which includes a first magnetic layer having a first surface and a second surface and a second magnetic layer having a third surface and a fourth surface. A break layer is between the first surface of the first magnetic layer and the third surface of the second magnetic layer. The first magnetic layer has a first Curie temperature that varies between the first surface and the second surface to define a first average Curie temperature and a first Curie temperature gradient. The second magnetic layer has a second Curie temperature that varies between the third surface and the fourth surface to define a second average Curie temperature and a second Curie temperature gradient. The first average Curie temperature is higher than the second average Curie temperature. The first Curie temperature at the first surface of the first magnetic layer is higher than the second Curie temperature at the third surface of the second magnetic layer.

In some scenarios, a heat-assisted magnetic recording (HAMR) device includes a recording head with a heat element that heats a magnetic media according to a thermal profile that moves along a data track during a write process. The HAMR device includes an apparatus which includes a first magnetic layer having a first surface and a second surface and a second magnetic layer having a third surface and a fourth surface. A break layer is between the first surface of the first magnetic layer and the third surface of the second magnetic layer. The first magnetic layer has a first Curie temperature that varies between the first surface and the second surface to define a first average Curie temperature and a first Curie temperature gradient. The second magnetic layer has a second Curie temperature that varies between the third surface and the fourth surface to define a second average Curie temperature and a second Curie temperature gradient. The first average Curie temperature is higher than the second average Curie temperature. The first Curie temperature at the first surface of the first magnetic layer is higher than the second Curie temperature at the third surface of the second magnetic layer.

In some examples, a data storage device includes a recording head with a heat element that heats a magnetic media according to a thermal profile that moves along a data track during a write process. The HAMR device includes an apparatus which includes a first magnetic layer having a first surface and a second surface and a second magnetic layer having a third surface and a fourth surface. A break layer is between the first surface of the first magnetic layer and the third surface of the second magnetic layer. The first magnetic layer has a first Curie temperature that varies between the first surface and the second surface to define a first average Curie temperature and a first Curie temperature gradient. The second magnetic layer has a second Curie temperature that varies between the third surface and the fourth surface to define a second average Curie temperature and a second Curie temperature gradient. The first average Curie temperature is higher than the second average Curie temperature. The first Curie temperature at the first surface of the first magnetic layer is higher than the second Curie temperature at the third surface of the second magnetic layer.

These and other features and aspects of various examples may be understood in view of the following detailed discussion and accompanying drawings.

DETAILED DESCRIPTION

Figure 1:
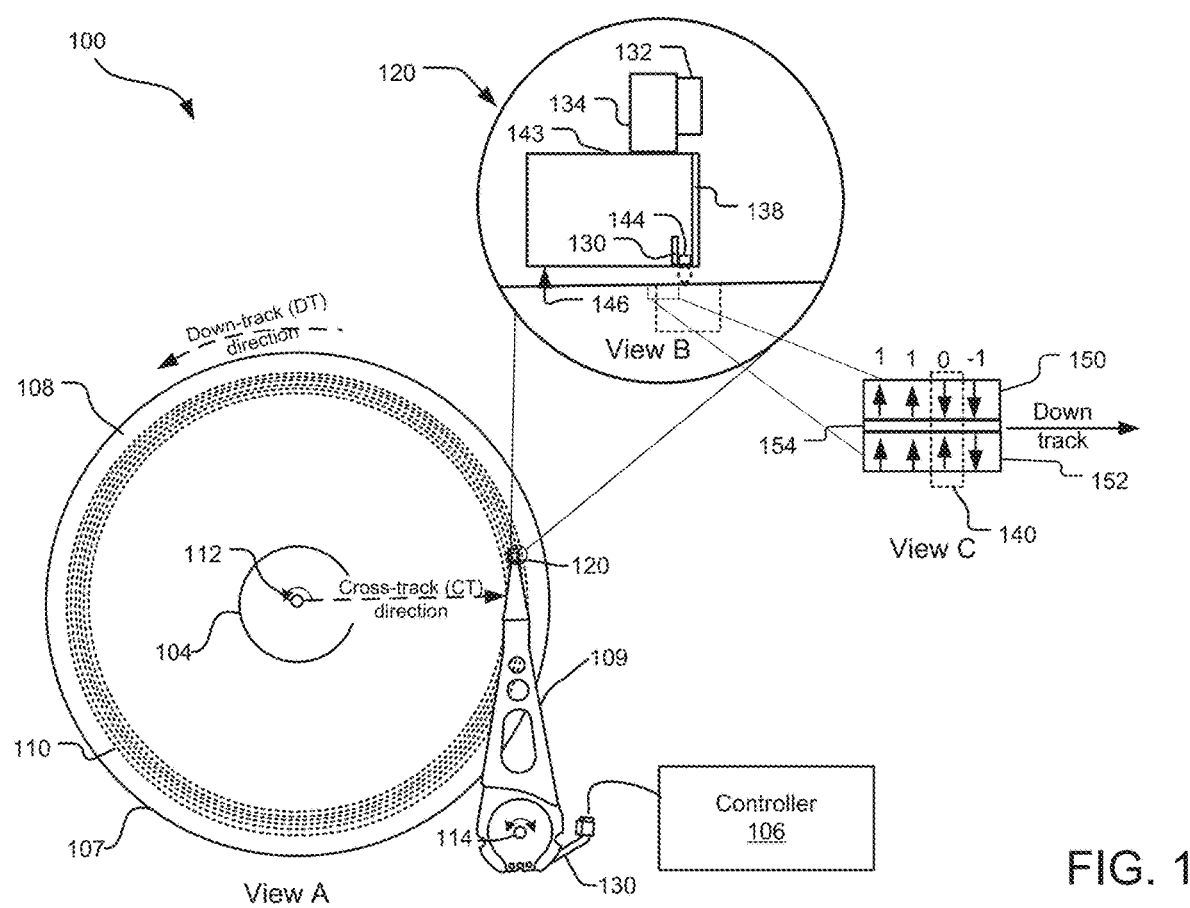
FIG. 1 illustrates a data storage device including a read/write head assembly for writing data on a magnetic storage medium.

FIG. 1 illustrates a data storage device including a read/write head assembly 120 for writing data on a magnetic storage medium. Data storage device 100 includes magnetic media 108 and read/write head assembly 120. Magnetic media 108 is a magnetic storage disc on which data bits can be recorded and read using read and write elements on read/write head assembly 120. As illustrated in View A of FIG. 1, magnetic media 108 includes inner diameter 104 and outer diameter 107. A number of concentric tracks (e.g., data track 110) are located between inner diameter 104 and outer diameter 107. Data may be written to or read from by read/write head assembly 120 at respective bit locations as magnetic media 108 rotates about a spindle center or magnetic media 108 axis of rotation 112.

Read/write head assembly 120 is mounted on actuator arm 109 at an end distal to actuator axis 114. Read/write head assembly 120 flies in close proximity above the surface of magnetic media 108 during magnetic media 108 rotation. Actuator arm 109 rotates during a seek operation about actuator axis 114 which positions read/write head assembly 120 over a target data track (e.g., data track 110) for read and write operations.

In the example of FIG. 1, read/write head assembly 120 is a heat-assisted magnetic recording (HAMR) head that includes a heat source applied to a bit location on magnetic media 108 during recording. By temporarily heating magnetic media 108 during the recording process, the magnetic coercivity of the magnetic grains in magnetic media 108 can be selectively lowered. This reduction in the magnetic coercivity of the magnetic grains can be achieved in a tightly focused area of magnetic media 108, substantially corresponding to an individual bit. The heated region is then encoded with the recorded data bit, based on the polarity of an applied magnetic write field. After cooling, the magnetic coercivity substantially returns to its pre-heated level, thereby stabilizing the magnetization for that data bit. After being recorded, such data bits can be read using a magnetoresistive read head.

Referring to View B of FIG. 1, read/write head assembly 120 includes, among other features, heat source 132 (e.g., a laser) coupled to submount assembly 134. Light from heat source 132 is directed into waveguide 138 mounted to slider 143. Light exiting the waveguide is focused via near-field transducer (NFT) 144 and applied to a bit location on magnetic media 108 while the bit location is subjected to a magnetic field generated by write element 130. As air-bearing surface 146 of read/write head assembly 120 "flies" across the surface of magnetic media 108, write element 130 selectively magnetizes the underlying magnetic grains of magnetic media 108.

Controller 106 generates control signals to control power to write element 130 and to control the polarity of the magnetic field generated by write element 130. In one example, controller 106 controls write element 130 to encode data bits of three logical states on a single pass of write element 130 over a data track on magnetic media 108. That is, write element 130 encodes data bits with positive magnetic polarity (1), data bits with negative magnetic polarity (−1), and data bits with approximately zero net magnetization.

Referring to View C of FIG. 1, magnetic media 108 is shown to include at least two magnetic recording layers. View C illustrates magnetic media 108 with an upper recording layer 150 and a lower recording layer 152. Upper recording layer 150 and lower recording layer 152 both include magnetic material FePt or an alloy thereof. An interface layer 154 separates upper recording layer 150 and lower recording layer 152 and may have different properties in different implementations.

In one implantation, upper recording layer 150 and lower recording layer 152 include granular material (e.g., material having magnetic grains separated from one another by a non-magnetic material). During a manufacturing process, the individual grains in upper recording layer 150 are grown on top of corresponding individual grains of lower recording layer 152. In at least one implementation, the magnetic grains in upper recording layer 150 are each aligned, in a 1-to-1 configuration, with a corresponding single grain in lower recording layer 152. The magnetic grains in both layers may be substantially the same in size (e.g., within +/−10% of one another) such that boundaries between the magnetic grains in lower recording layer 152 substantially align with boundaries between the grains in upper recording layer 150 (e.g., grain centers or grain edges are aligned within +/−10%).

View C illustrates 4 data bits that have been written in sequence during a single pass of read/write head assembly 120 over magnetic media 108. Each data bit is represented by a pair of vertically stacked arrows that further represent multiple magnetic grains in a tightly focused area. From left to right, View C shows a sequence of data bits in the corresponding states 1, 1, 0, and −1. The '1' state data bits each have a positive polarity. That is, substantially all grains in upper recording layer 150 and in lower recording layer 152 of the data bit are fixed to have a positive polarity. The '−1' state data bits each have a negative polarity, meaning that substantially all grains in upper recording layer 150 and in lower recording layer 152 are fixed to have a negative polarity. The '0' state data bit (e.g., in region 140 of View C) has a polarity of substantially zero due to each grain in upper recording layer 150 being fixed to have a polarity that is opposite that of a corresponding (stacked) magnetic grain in lower recording layer 152. In View C, the illustrated '0' state data bit 140 is shown to have a negative polarity in upper recording layer 150 and a positive polarity in lower recording layer 152. While it may be the case that all grains in upper recording layer 150 of the data bit have negative polarity and all grains in lower recording layer 152 have positive polarity, it is to be appreciated that this is just one example of magnetic grain orientation that results in substantially net zero polarity within region 140. For example, in some implementations, all grains in upper recording layer 150 of the data bit may have positive polarity and all grains in lower recording layer 152 may have negative polarity. This configuration would also result in substantially zero net polarity within region 140.

The term "substantially zero polarity" is used herein to refer to regions where the individual grains have true substantially net zero polarity (e.g., each grain has an upper layer portion with a polarity opposite in magnitude and sign of that of a corresponding lower layer portion). However, "substantially zero polarity" is also intended to encompass the scenario where the magnetic and/or physical characteristics of the two recording layers are tuned such that the reader on read/write head assembly 120 detects substantially zero polarity in a given region when the true net polarity of the region is somewhat greater or less than substantially zero. Since upper recording layer 150 is closer in proximity to read/write head assembly 120 than lower recording layer 152, lower recording layer 152 may contribute less to the readback signal than upper recording layer 150. Consequently, there exist scenarios where the net polarity of the region could be zero but where the reader nevertheless detects a non-zero signal. To adjust for this, some implementations of the disclosed technology may provide for running of lower recording layer 152 to have an Mrt (magnetization saturation multiplied by recording layer thickness) that is greater than the Mrt of upper recording layer 150. This would ensure that the reader detects substantially zero net polarity in the zero state regions. In these cases, the "zero state" regions on magnetic media 108 may have a true polarity biased toward that of lower recording layer 152 (due to its greater Mrt), but an effective polarity that is detected by the reader as being zero or substantially zero. This tuning of Mrt may be performed with respect to any of the implementations disclosed herein.

According to the various implementations disclosed herein, the three logical states illustrated in View C may all be written, in entirety, during a single pass of the read/write head above rotating magnetic media 108.

The herein disclosed "zero state" write techniques may also be utilized to insert small areas of neutral polarity between positive and negative data bits in either a conventional recording process (e.g., one that performs binary recording) or a recording process using the 3-state recording techniques disclosed herein. By inserting small areas of zero net polarity along the boundaries between data bits, signal-to-noise can be dramatically improved. These small areas of zero net polarity may be referred to as the zero-insertion width (ZIW).

Figure 2:
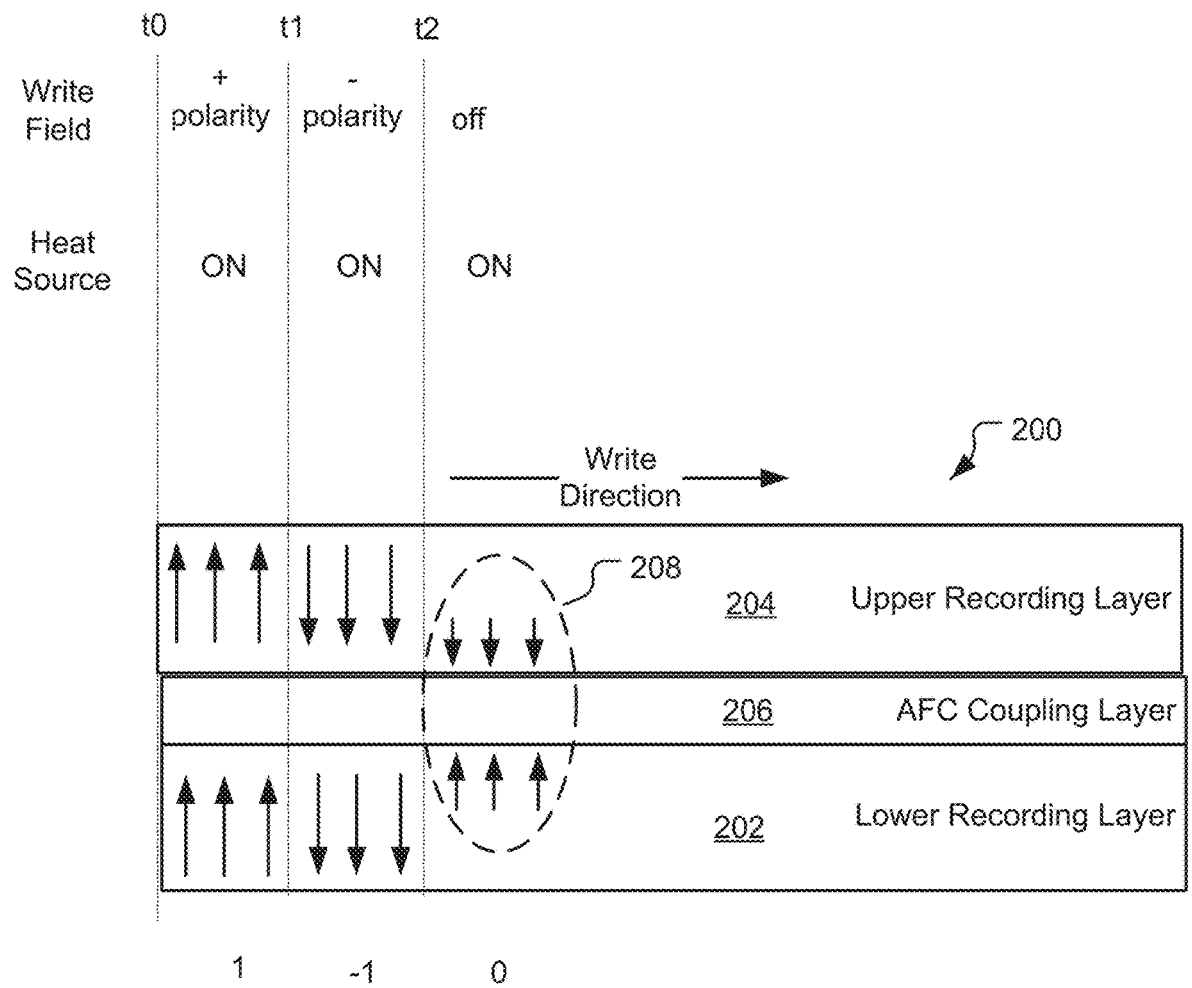
FIG. 2 illustrates an example magnetic media that may facilitate writes of zero-state polarity to localized regions of magnetic grains in a HAMR device.

FIG. 2 illustrates an example magnetic media 200 that may facilitate writes of zero-state polarity to localized regions of magnetic grains in a HAMR device. Magnetic media 200 includes at least lower recording layer 202, upper recording layer 204, and antiferromagnetic coupling (AFC) layer 206. In this example, lower recording layer 202 and upper recording layer 204 both comprise a recording material (e.g., FePt or an alloy thereof) and may have the same or different magnetic characteristics (e.g., Curie temperature, coercivity, anisotropy). AFC layer 206 is a metal insertion layer that facilitates a weak antiferromagnetic coupling between upper recording layer 204 and lower recording layer 202. In the absence of an applied magnetic field, the antiferromagnetic coupling causes magnetic grains in upper recording layer 204 to align with the opposite polarity along the interface to AFC layer 206, as shown in region 208.

In FIG. 2, timesteps t0, t1, and t2 illustrate states of a heat source and of a write field applied by a write element that are effective to write corresponding logical states 1, −1 and 0 (from left to right) on the data bits of magnetic media 200. At time t0, the heat source is in the "ON" state and the applied write field has a positive polarity. As magnetic media 200 cools in the presence of the applied positive polarity magnetic field, the magnetization in upper recording layer 204 and lower recording layer 202 align to the same direction as the applied write field as it cools and maintains the positive polarity due to the high anisotropy of the FePt grains within the individual layers.

At time t1, the heat source is in the "ON" state and the applied write field is switched to a negative polarity. As magnetic media 200 cools in the presence of the applied negative polarity magnetic field, the magnetization in upper recording layer 204 and lower recording layer 202 align to the same direction as the applied write field as it cools and maintains negative polarity due to the high anisotropy of the FePt grains within the individual layers.

At time t2, the heart source is left in the "ON" state, but the write field is switched off. In this case, the magnetic grains in the underlying region are heated but not subjected to a magnetic field. As the grains in this region cool, there is a small region of AFC coupled magnetic domain (e.g. opposing polarity grains) that start to form near the interface to AFC layer 206. As cooling continues, the opposing polarity domain grows within these grains and establishes fully opposing magnetization states between upper and lower layers which is stable at operating temperature due to the high anisotropy of the FePt grains. This effect drives the net magnetization of the individual grains within the corresponding data bit close to zero.

Whereas the implementation of FIG. 2 utilizes a weak AFC coupling field and corresponding heat only and no applied field to create regions of net zero polarity (e.g., region 208), FIG. 3 to FIG. 10 illustrate alternate examples that rely on differences in magnetic characteristics between the two stacked magnetic recording layers to generate regions of zero state polarity. Among other characteristics, these examples provide for a lower Curie temperature in one of the magnetic recording layers than in the other magnetic recording layer. In some examples, the upper recording layer is the layer with the lower Curie temperature. In other examples, the lower recording layer is the layer with the lower Curie temperature.

Figure 3:
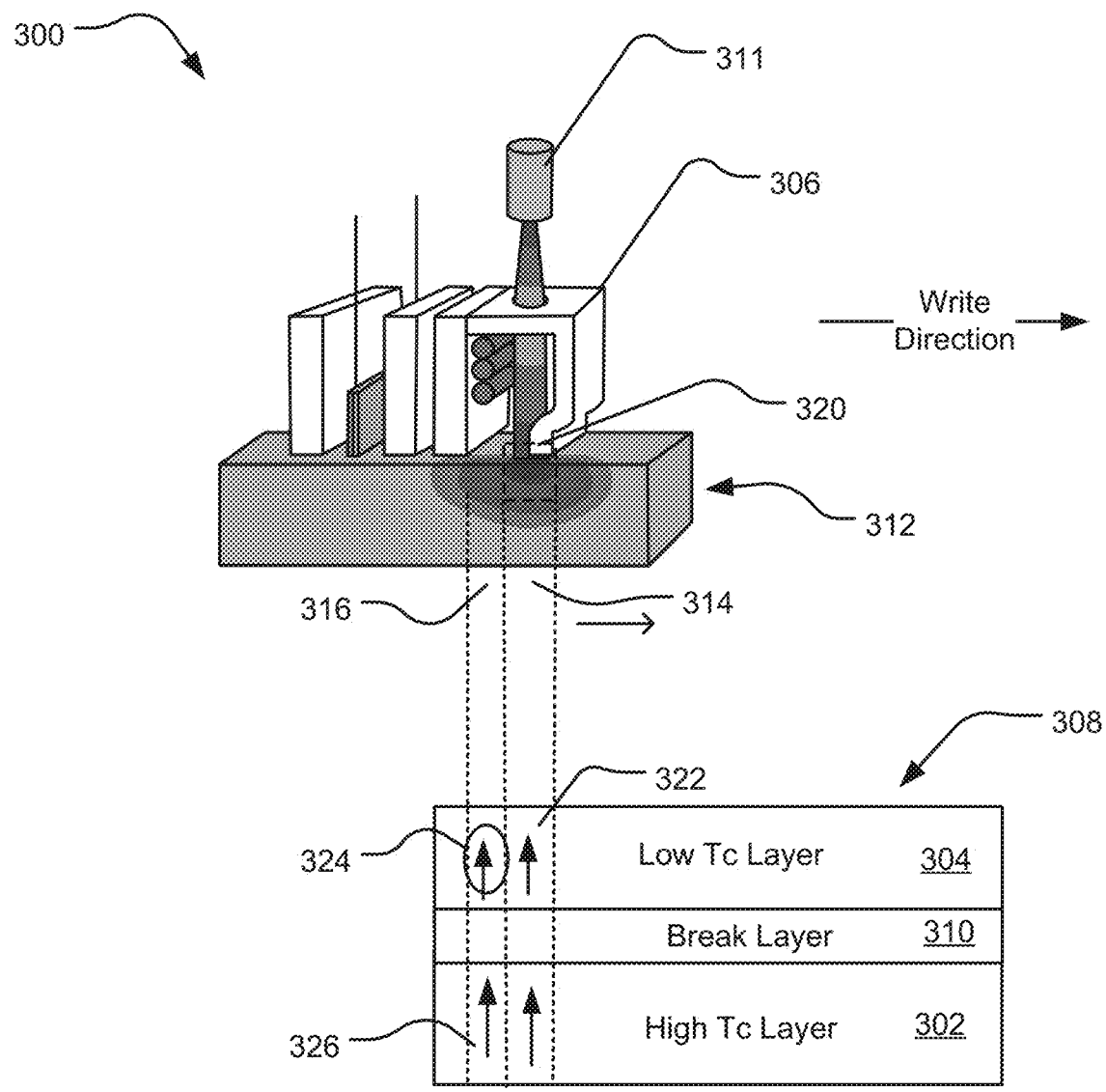
FIG. 3 illustrates aspects of an example HAMR device that writes regions of zero-state polarity by leveraging different thermal magnetic characteristics of an upper recording layer and a lower recording layer.

FIG. 3 illustrates aspects of an example HAMR device 300 that writes regions of zero-state polarity by leveraging different thermal magnetic characteristics of an upper recording layer and a lower recording layer to selectively cause certain magnetic reversals to be isolated to the upper recording layer while causing other magnetic reversals to simultaneously occur in both the upper recording layer and in the lower recording layer. In FIG. 3, the lower recording layer has a higher Curie temperature than the upper recording layer (e.g., the layer closest to the write element). For this reason, lower recording layer is referred to as high Tc layer 302 while the upper recording layer is referred to as low Tc layer 304.

As write element 306 flies above rotating underlying magnetic media 308, laser 311 heats a tightly localized underlying region of magnetic media 308. Laser 311 generates a thermal profile 312 that moves along a data track while data is being recorded to the track. Thermal profile 312 varies according to a heat gradient having a highest temperature underlying near-field transducer (NFT) 320 and temperature that decreases with distance from NFT 320. While thermal profile 312 moves along the plane of magnetic media 308, higher temperature zone 314 exists near the center of thermal profile 312 (e.g., at least partially underlying NFT 320) while lower temperature zone 316 trails higher temperature zone 314.

Magnetic media 308 has characteristics such that higher temperature zone 314 is within a temperature range sufficient to facilitate magnetic reversals in both low Tc layer 304 and high Tc layer 302, in the presence of an applied magnetic field. In contrast, lower temperature zone 316 is within a temperature range sufficient to facilitate magnetic reversals in low Tc layer 304 but not in high Tc layer 302 in the presence of an applied magnetic field. Because of this, a magnetic grain in low Tc layer 304 can be recorded for a longer period of time (e.g., as it passes beneath NFT 320) than its corresponding (stacked) magnetic grain in high Tc layer 302. That is, magnetic grains in low Tc layer 304 can be recorded when passing through both higher temperature zone 314 and lower temperature zone 316. In contrast, magnetic grains in high Tc layer 302 can be recorded only when passing through higher temperature zone 314.

By example and without limitation, grains in a region 324 may be initially recorded at a positive polarity state when passing through higher temperature zone 314 (which simultaneously causes magnetic reversals in underlying region 326). Once region 324 moves into lower temperature zone 316, grains within region 324 may, in some examples, still be recorded without affecting the polarity of the grains in underlying region 326. If, for example, the polarity of the magnetic field is switched as region 324 moves from higher temperature zone 314 to lower temperature zone 316, region 324 may have data bits that are fixed in a magnetic state opposite that of the underlying grains in region 326.

In FIG. 3, low Tc layer 304 and high Tc layer 302 are separated from one another by break layer 310. In some examples, break layer 310 is a non-magnetic layer thick enough to fully decouple low Tc layer 304 from high Tc layer 302 at room temperature. Break layer 310 may, for example, comprise a dielectric material, ruthenium, platinum, chromium or cobalt-chrome.

Similar to an AFC coupling layer (e.g., AFC layer 206 of FIG. 2), break layer 310 is, ideally, a material that provides upper and lower interface characteristics that promote L10 lattice growth within the top layer (e.g., low Tc layer 304).

In some examples, break layer 310 is a magnetic layer which may include the same base material as the upper recording layer and the lower recording layer (e.g., FePt) and may serve as a good template for growth of the grains of the upper recording layer. Additionally, break layer 310 may be granular such that it grows on magnetic grains in the lower recording layer with a 1:1 alignment such that the boundaries between its grains are substantially aligned with the boundaries between grains in the lower recording layer, high Tc layer 302. Consequently, the upper recording layer can then be grown such that its magnetic grain boundaries align between upper and lower layers (e.g., because the magnetic grains naturally align with underlying magnetic grains and the grains may be of the same size due to similarities in material composition). When looking at magnetic materials (FePt), these ideal characteristics are easier to satisfy than in non-magnetic materials.

FIG. 3 is an example of magnetic media with an upper recording layer with lower Curie temperature and lower recording layer with a higher Curie temperature. In some examples, the upper recording layer is the layer with the higher Curie temperature and lower recording layer with lower Curie temperature.

Figure 4:
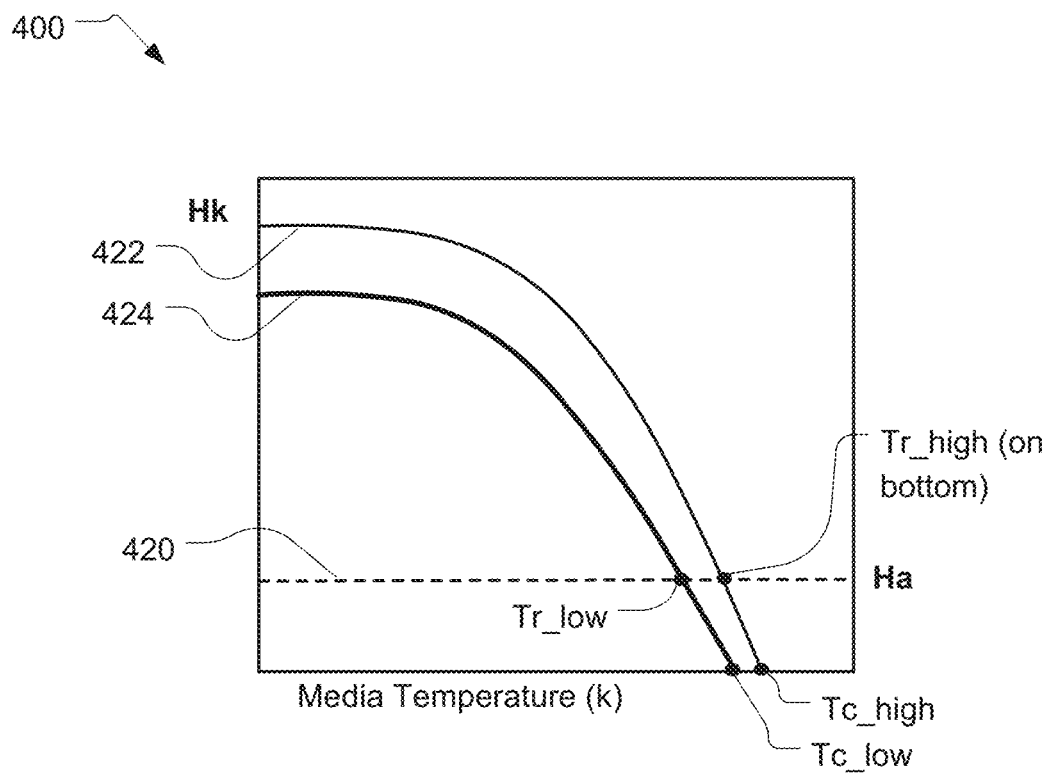
FIG. 4 illustrates characteristics of another example magnetic media suitable for implementing the techniques discussed above with respect to FIG. 3.
Figure 4:
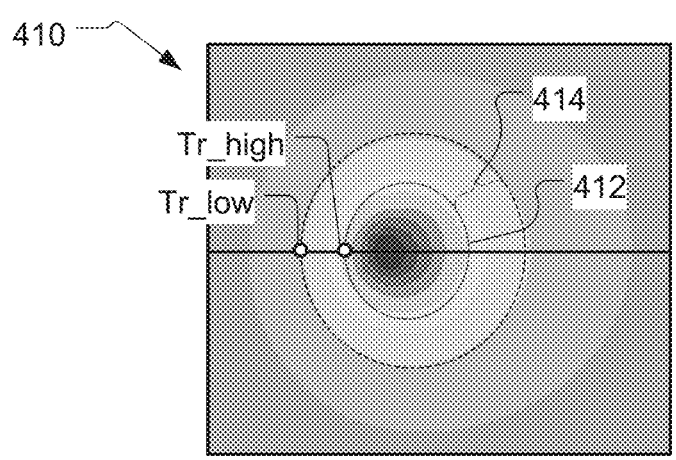

FIG. 4 illustrates plot 400 showing characteristics of a HAMR device media suitable for implementing the techniques discussed with respect to FIG. 3. The HAMR device includes a magnetic media (not shown) with a structure the same or similar to that shown in FIG. 3, including dual recording layers, where the lower recording layer further from the write element has a higher Curie temperature than the upper recording layer closer to the write element. The lower recording layer and the upper recording layer are separated by a break layer that may have characteristics the same or similar to those discussed with respect to FIG. 3.

Plot 400 illustrates thermal characteristics of the media layers as well as recording temperatures employed within a HAMR device. In plot 400, horizontal line 420 illustrates a magnitude of applied magnetic write field (Ha) as the layers of the media undergo changes in magnetic anisotropy and temperature. A first line 422 illustrates trends in the thermal characteristics for the high Tc layer and a second line 424 illustrates trends in the thermal characteristics for the low Tc layer. A point labeled "Tc_high" marks the Curie temperature of the high Tc layer (lower layer in the example of FIG. 4) and a point labeled "Tc_low" marks the Curie temperature of the low Tc layer (upper layer in the example of FIG. 4). Similarly, a point labeled "Tr_high" marks the recording temperature of the high Tc layer (lower layer) and a point labeled "Tr_low" marks the recording temperature of the low Tc layer (upper layer). Tc and Tr values for individual layers are highly correlated and the Tr value is offset from the Tc value depending on the magnitude of applied magnetic write field, Ha. However, since both upper layer and lower layer "see" the same field magnitude, the difference in Tr values between the two layers will remain essentially constant regardless of applied magnetic write field value.

For each of the high Tc layer (lower layer) and the low Tc layer (upper layer), there exists a distinct temperature range in which magnetic reversals can occur in the presence of applied magnetic field (Ha). Between Tr_high and Tc_high, magnetic reversals are possible for the high Tc layer (lower recording layer). Between Tr_low and Tc_low, magnetic reversals are possible for the low Tc layer (upper recording layer).

These temperature ranges depend upon the anisotropy (Hk) and the Curie temperature of the material in each recording layer. In general, magnetic reversals of individual grains cannot occur above a layer's Curie temperature. As the material cools down below the Curie temperature, the magnetic moment of the material gradually increases and, at the same time, the magnetic field required to flip the direction of the moment from its current orientation also increases as the media anisotropy increases. Therefore, if the layer is in the presence of a magnetic field when its temperature drops below the Curie temperature of the layer, the layer will be magnetized in the direction of the applied write field and the layer's magnetic moment will increase, thus locking in the magnetization direction as the layer cools down to operating temperatures. If the direction of the applied write field is then reversed while the same layer continues to cool, the developed magnetic moment then switches to the direction of the newly applied write field provided that the layer's anisotropy (Hk) has not yet increased beyond the strength of the applied write field (e.g., applied write field as represented by line 420 in FIG. 4).

If a given one of the layers has cooled enough that the layer's Hk is larger than the applied write field at the time of the field reversal, the moment will not be switched, and the previous magnetization direction is "frozen in". If, however, the temperature is still high enough that the Hk of the material is still less than the applied write field, then whatever moment has developed will switch to the new applied write field direction.

Given that for any magnetic material, it is possible to readily determine a corresponding temperature range in which magnetization reversals are possible, it is also possible to select materials for magnetic recording layers that allow for matching of these temperature ranges to temperature zones within a thermal profile created by a recording head in a HAMR device to realize 3-state recording techniques.

For example, a top-down thermal profile 410 created by the HAMR write element includes higher temperature zone 412 bounded by a contour line at the temperature Tr_high and a lower temperature zone 414 bounded by a contour line at the temperature Tr_low. When a magnetic grain is heated to temperature Tr_high, magnetic reversals may be realized in both the high Tc layer and the low Tc layer. When a magnetic grain is heated to the temperature Tr_low, magnetic reversals may be realized in the low Tc layer but not in the high Tc layer. Therefore, as a data bit travels through thermal profile 412, both recording layers can be written at Tr_high. However, by the time the data bit reaches Tr_low, the magnetization of the high Tc layer is "locked in" while the magnetization of the low Tc layer is still subject to change.

FIG. 5A-5D illustrate operations performed by a HAMR device having the characteristics described with respect to FIGS. 3 and 4. That is, the HAMR device includes a magnetic media with dual recording layers including a low Tc layer 502 and a high Tc layer 504 separated by a break layer 510. The HAMR device includes a magnetic media 508 that generates a thermal profile 512 with characteristics the same or similar to that described with respect to FIG. 4 relative to temperature zones in which reversals are possible for each of the two layers. This thermal profile 512 includes a higher temperature zone 514 and a lower temperature zone 506. An outer edge of the higher temperature zone 514 corresponds to a recording temperature Tr_high and an outer edge of the lower temperature zone 506 corresponds to a recording temperature Tr_low, where Tr_low and Tr_high may be defined as in FIG. 4.

Figure 5A:
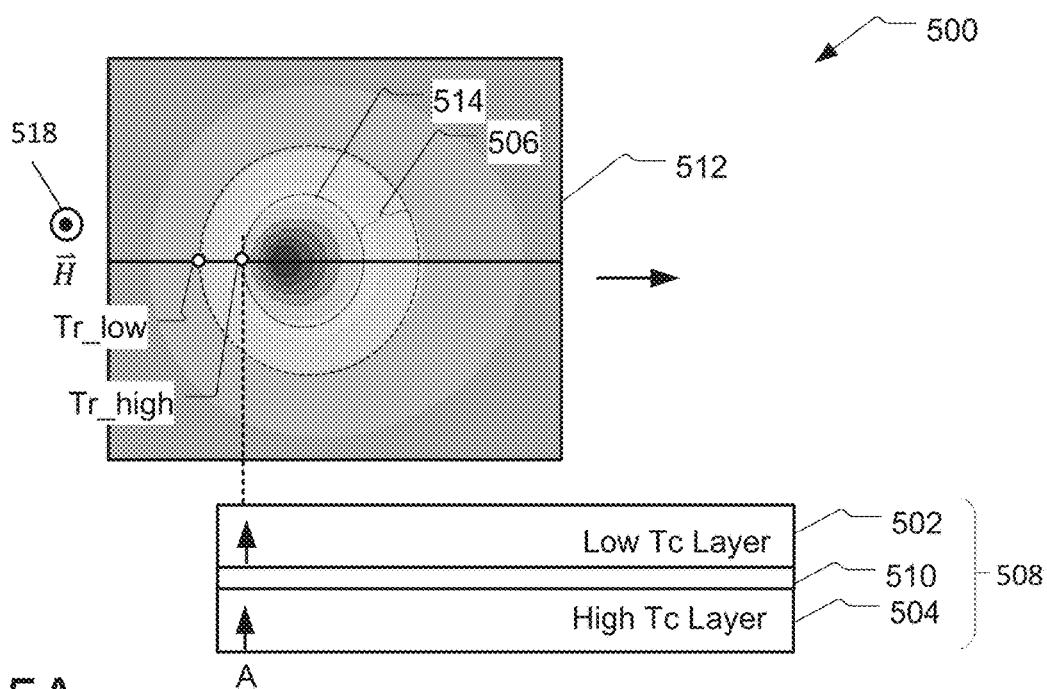
FIG. 5A illustrates a cross-sectional view of media layers during a first example recording operation in a HAMR device that writes regions of neutral polarity to a magnetic media.

FIG. 5A illustrates a cross-sectional view of media layers during a first example recording operation 500 for writing a zero-state data bit in a HAMR device. Here a first localized region 'A' is passing through higher temperature zone 514 of the media and is cooling to temperature Tr_high while a positive polarity field 518 is applied. Since temperature Tr_high is sufficient to facilitate magnetic reversals in both low Tc layer 502 and high Tc layer 504 of region 'A', magnetic grains are positively polarized in both layers.

Figure 5B:
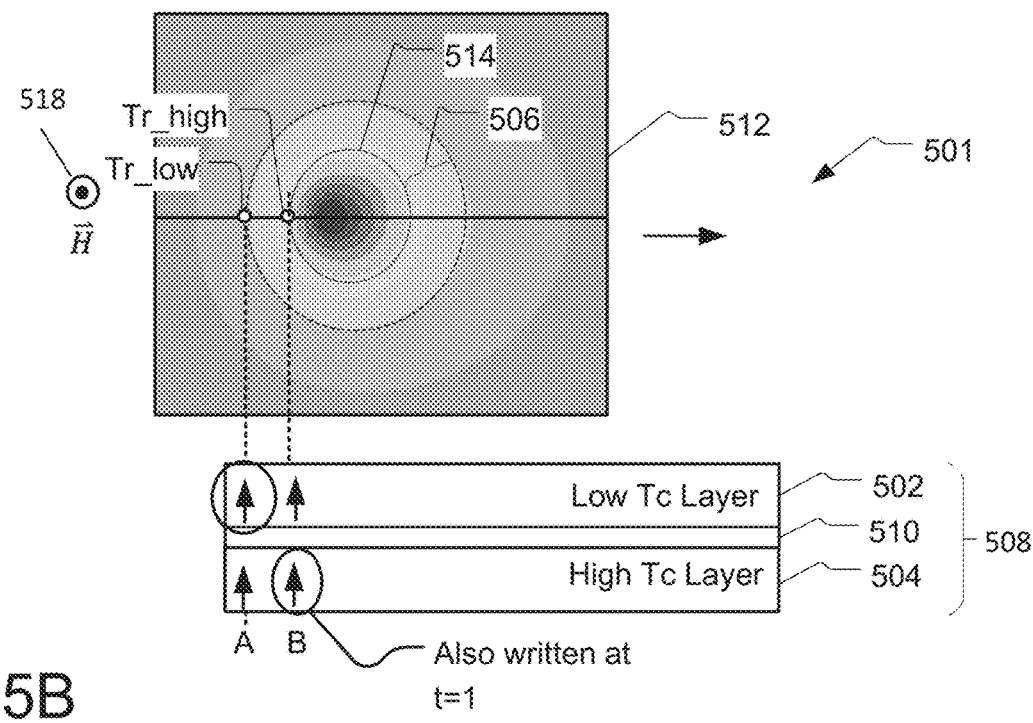
FIG. 5B illustrates a cross-sectional view of the media layers of FIG. 5A during a second example recording operation.

FIG. 5B illustrates a second example recording operation 501 following that of FIG. 5A and recording operation 501. Here, the media has rotated slightly such that the read-write head has shifted in the down-track position relative to magnetic media 508 and the heat element is now positioned over another localized region 'B'. Since positive write field 518 is still being applied, the magnetic moment of the grains within low Tc layer 502 and high Tc layer 504 of region 'B' are again rotated to align with the positive write field. At this point in time, localized region 'A' that was previously written per the operations illustrated in FIG. 5A is now located within cooler temperature zone 506 of thermal profile 512. The temperature of region 'A' is cooling toward the temperature Tr_low, which is sufficient to facilitate magnetic reversals in low Tc layer 502 but not in high Tc layer 504. Thus, at Tr_low, the grains in the upper layer of region 'A' have the potential to be overwritten (e.g., flipped and locked in). However, since the field direction has not actually changed, this region maintains its positive polarity.

Figure 5C:
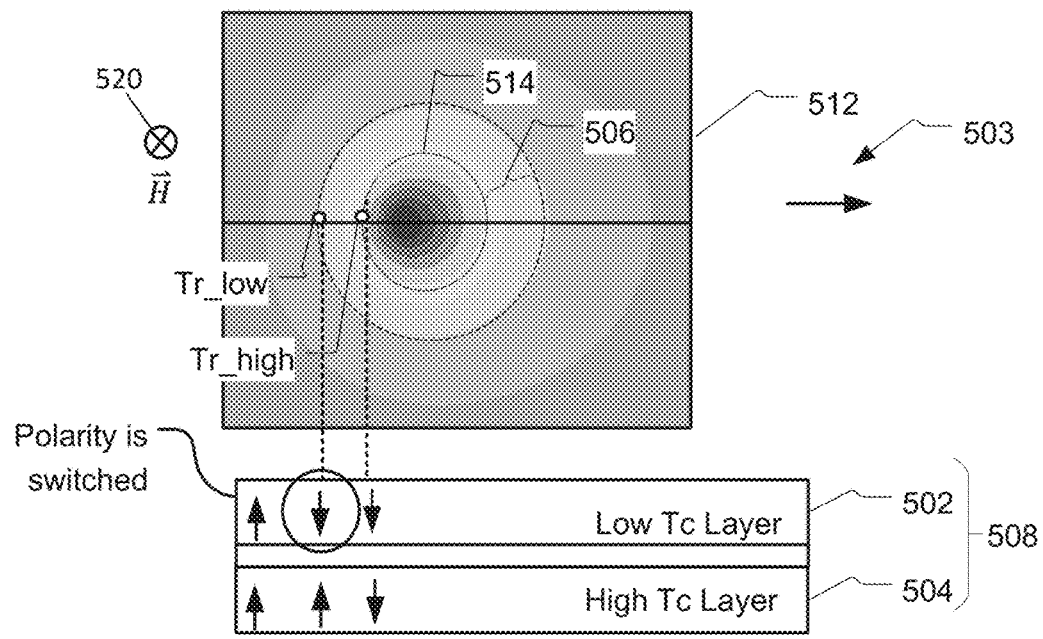
FIG. 5C illustrates a cross-sectional view of the media layers of FIGS. 5A & 5B during a third example recording operation.

FIG. 5C illustrates a third example recording operation 503 following that of FIG. 5B. Here, the media has again rotated slightly such that read-write head has shifted in the down-track direction of magnetic media 508. The heat element is now positioned over another localized region 'C'. At this point in time, the direction of the applied write field 520 is switched to a negative polarity. Region 'C' which is passing through higher temperature zone 515 is magnetized (at Tr_high) such that grains in both the low Tc layer 502 and high Tc layer 504 are rotated to match the direction of the now-negative applied write field 520.

At this same point in time, localized region 'B' that was previously written per the operations illustrated in FIG. 5B is now passing through lower temperature zone 506 of thermal profile 512. The temperature of region 'B' approaches Tr_low which is sufficient to facilitate magnetic reversals in low_Tc layer 502 but not in high_Tc layer 504. Thus, at Tr_low, the grains in upper layer of region 'B' have the potential to be overwritten. Since the direction of the applied write field has changed, the grains in region 'B' of low_Tc layer are flipped from the positive direction to the negative direction (as shown) without affecting the polarity of grains in high_Tc layer 504. At this point in time, region 'A' has positive polarity (e.g., a 1 bit value), region 'B' has net zero polarity (e.g., a 0 bit value), and region 'C' has negative polarity (e.g., a −1 bit value).

Figure 5D:
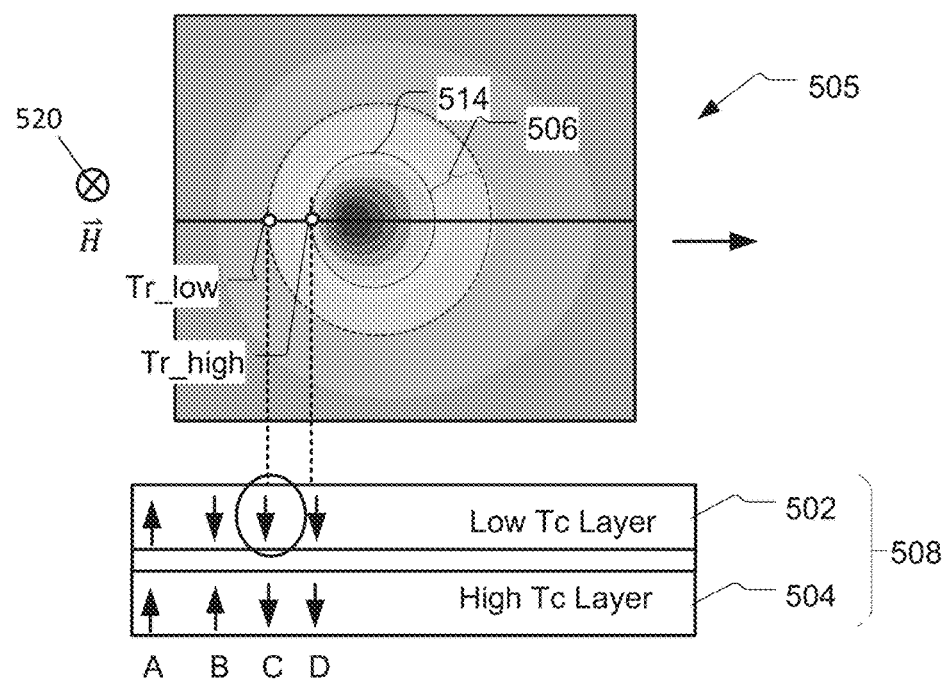
FIG. 5D illustrates a cross-sectional view of the media layers of FIG. 5A-5C during a fourth example recording operation.

FIG. 5D illustrates a fourth example recording operation 505 following that of FIG. 5C. Here, the media has again rotated slightly such that read-write head has shifted in the down-track direction of the magnetic media, and the heat element is now positioned over another localized region 'D'. Since negative write field 520 is still being applied, the magnetic moment of the grains within low Tc layer 502 and high Tc layer 504 of region 'D' are again rotated to align with the negative write field. At this point in time, localized region 'C' that was previously written per the operations illustrated in FIG. 5c is now located within cooler temperature zone 506 of thermal profile 512. The temperature of region 'A' is cooling toward the temperature Tr_low, which is sufficient to facilitate magnetic reversals in low Tc layer 502 but not in high Tc layer 504. Thus, at Tr_low, the grains in the upper layer of region 'C' have the potential to be overwritten (e.g., flipped and locked in). However, since the field direction has not actually changed, this region maintains its negative polarity.

Figure 6:
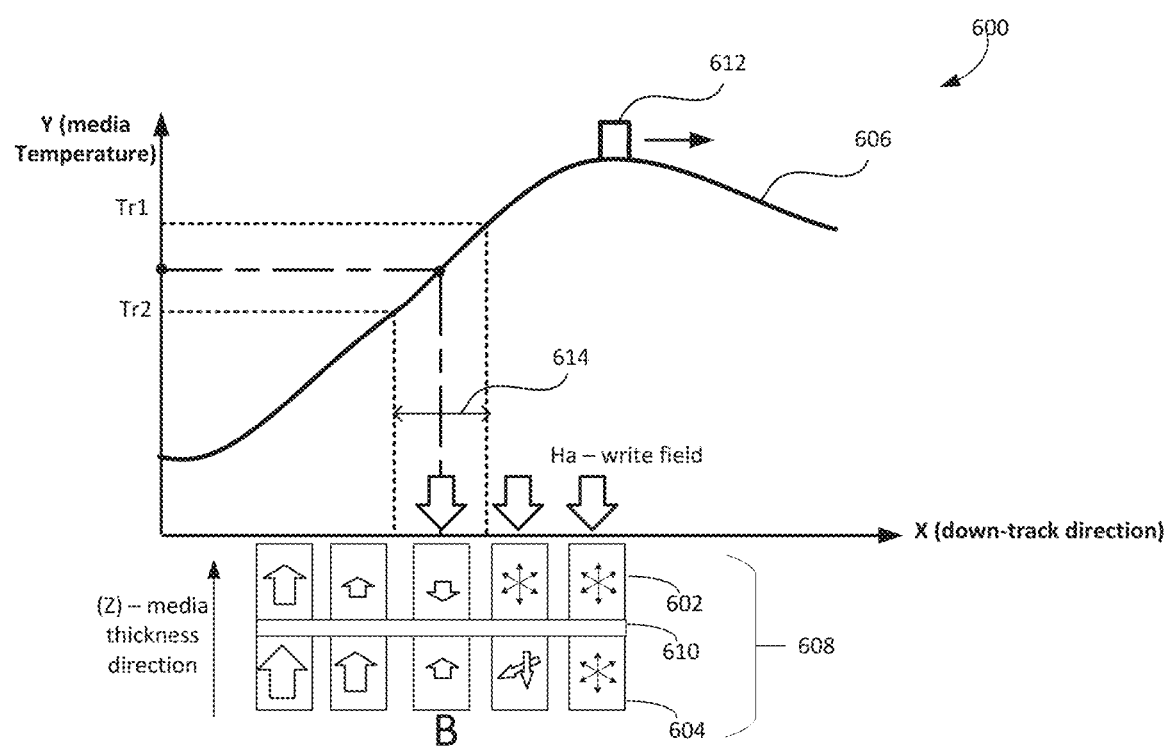
FIG. 6 illustrates operations performed by a HAMR device having the characteristics described with respect to FIGS. 5A-5D.

FIG. 6 and plot 600 illustrates operations performed by a HAMR device having the characteristics described with respect to FIGS. 5A-5D. That is, the HAMR device includes a magnetic media 608 with dual recording layers including low Tc layer 602 and high Tc layer 604, separated by break layer 610. Plot 600 of FIG. 6 includes thermal profile 606 of magnetic media 608 in the down-track direction. FIG. 6 describes a scenario whereby there is no vertical temperature gradient (in the z-direction) in magnetic media 608. In other words, for a particular down-track location on the x-axis of plot 600, the temperature of high Tc layer 604 is substantially the same as the temperature of low Tc layer 602.

On the y-axis of plot 600, Tr1 represents the recording temperature of high Tc layer 604 and Tr2 represents the recording temperature of low Tc layer 602. In this example, the temperature of the grains in low Tc layer 602 and the temperature of the grains in high Tc layer 604 (e.g., the media temperature in a vertical, or cross-track direction) are substantially the same. However, as described in FIGS. 5A-5C, and as observed in plot 600, the temperature of magnetic media 608 changes in the down-track direction, due to the heating profile of near-field transducer 612. Because NFT 612 heats magnetic media 608 beneath it, the media temperature (e.g., y-axis in plot 600) decreases away from NFT 612 location.

Region 'B' in FIG. 6 represents a region with zero net polarity (e.g., a 0-bit value), the formation of which is described in relation to FIG. 5C, above. In this region, the grains in high Tc layer 604 are already "frozen-in' in a positive direction since the media temperature in region 'B' is lower than the recording temperature (Tr1) for that layer. Therefore, grains in this region will not respond to the now negative applied write field, Ha. The grains in low Tc layer 602, however, have a temperature that is higher than the recording temperature (Tr2) for that layer and the grains can respond to the negative applied write field, Ha and flip to a negative direction.

The region of media with zero net polarity (e.g., region B in FIG. 6) is referred to as the zero-insertion width (ZIW) 614 and its dimension is determined by both the vertical temperature gradient in magnetic media 608 and the delta between Tr1 and Tr2. In some examples ZIW 614 is equivalent to about half the standard grain size of grains in magnetic media 608. For example, ZIW 614 may be on the order of about 3 nm to about 4 nm.

FIG. 6 describes a scenario whereby there is no vertical temperature gradient in magnetic media 608. Thus, ZIW 614 is defined by the delta between Tr1 and Tr2. In a scenario where there is no vertical temperature gradient in the media and where Tr1=Tr2 then ZIW 614 is substantially zero and it may not be possible to write a region with zero net polarity. Thus, the recording temperature of each layer may be tuned to define the dimension of the ZIW (e.g., ZIW 614).

Figure 7:
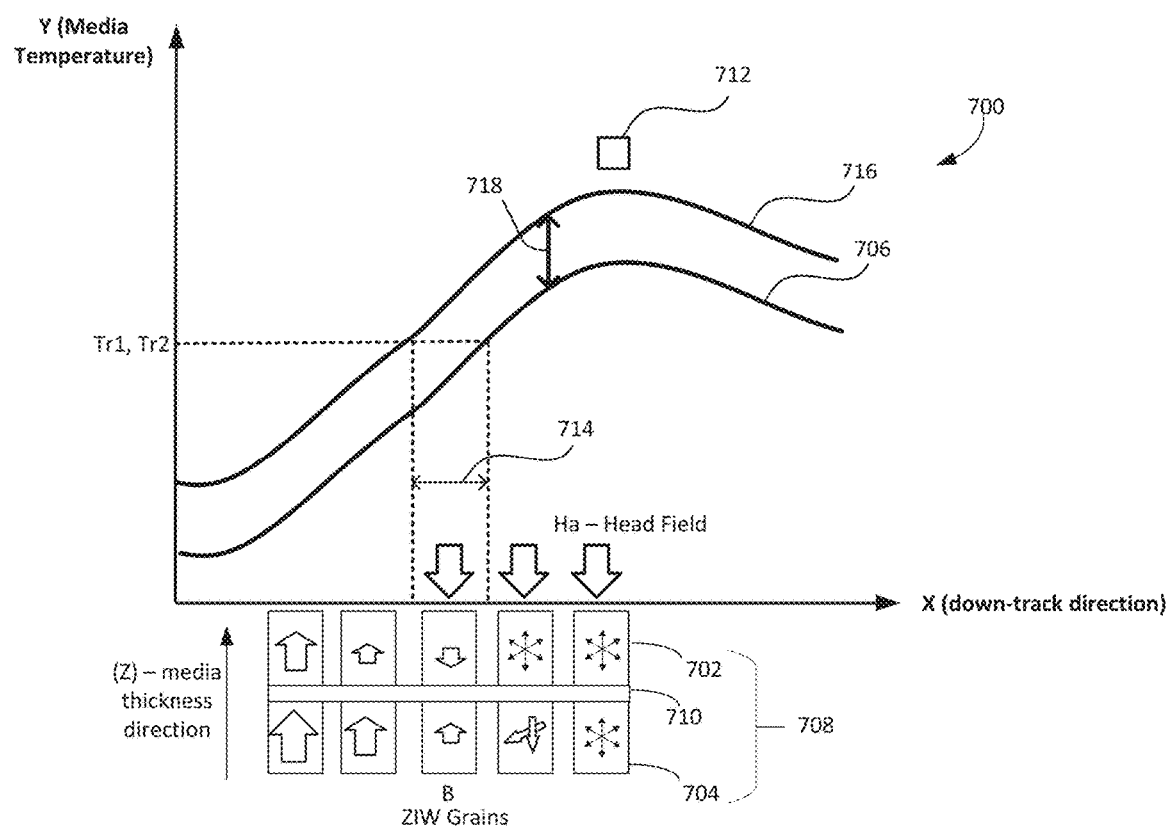
FIG. 7 illustrates operations performed by a HAMR device having the characteristics described with respect to FIGS. 5A-5D.

FIG. 7 and plot 700 further illustrate operations performed by a HAMR device having the characteristics described with respect to FIGS. 5A-5D. That is, the HAMR device includes a magnetic media 708 with dual recording layers including upper recording layer 702 and lower recording layer 704, separated by break layer 710. FIG. 7 describes a scenario whereby there is a vertical temperature gradient in magnetic media 708. Plot 700 of FIG. 7 includes thermal profile 706 of lower recording layer 704 in the down-track direction and thermal profile 716 of upper recording layer 702 in the down-track direction.

On the y-axis of plot 700, Tr1 represents the recording temperature of lower recording layer 704 and Tr2 represents the recording temperature of upper recording layer 702. In this example, the recording temperature of lower recording layer 704 is approximately the same as the recording temperature of upper recording layer 702. In the scenario described in FIG. 7, the temperature of the grains in upper recording layer 702 are however, higher than the temperature of the grains in lower recording layer 704. The temperature difference between upper recording layer 702 and lower recording layer 704 is represented by temperature delta 718. Temperature delta 718 is substantially constant across the down-track direction. Temperature delta 718 between lower recording layer 704 and upper recording layer 702 may be present due to a variety of reasons that are not illustrated in FIG. 7, including, but not limited to, the presence of a heat sink layer adjacent to magnetic media 708, or a cap layer on top of magnetic media 708. In some examples, the presence of a heat sink layer may induce a thermal profile in magnetic media 708.

The temperature of magnetic media 708 also changes in the cross-track direction (z-direction in FIG. 7), due to the heating profile of near-field transducer 712. Because NFT 712 heats magnetic media 708 beneath it, the media temperature (e.g., y-axis in plot 700) decreases away from NFT 712 location.

Zero-insertion width (ZIW) 714 is also illustrated in FIG. 7. Like the scenario described in relation to FIG. 6, ZIW 714 is a region with zero net polarity. In the example of FIG. 7, although each of lower recording layer 704 and upper recording layer 702 have substantially the same Tr, the temperature at which grains are "frozen in" is different for each layer due to the temperature gradient that is present in the vertical (z) direction. The presence of a temperature gradient in the vertical (z) direction allows for upper recording layer 702 and lower recording layer 704 to have similar or substantially the same recording temperature and still maintain a region of zero net polarity (e.g., ZIW 714). Thus, in the scenario described in FIG. 7, the dimension of ZIW 714 may be determined by considering the vertical temperature gradient within magnetic media 708.

One factor that may be considered when writing zero-state grains in dual-layer media is the interaction effect between the two magnetic media layers. A reliable zero-state grain is formed when there is little or no magnetostatic interaction between the upper recording layer (e.g., upper recording layer 702) and the lower recording layer (e.g., lower recording layer 704). If there is a strong magnetostatic interaction field from, for example, the upper recording layer during the switching process, then the lower recording layer may be susceptible to demagnetization or destabilization of magnetization from the upper recording layer field.

Figure 8:
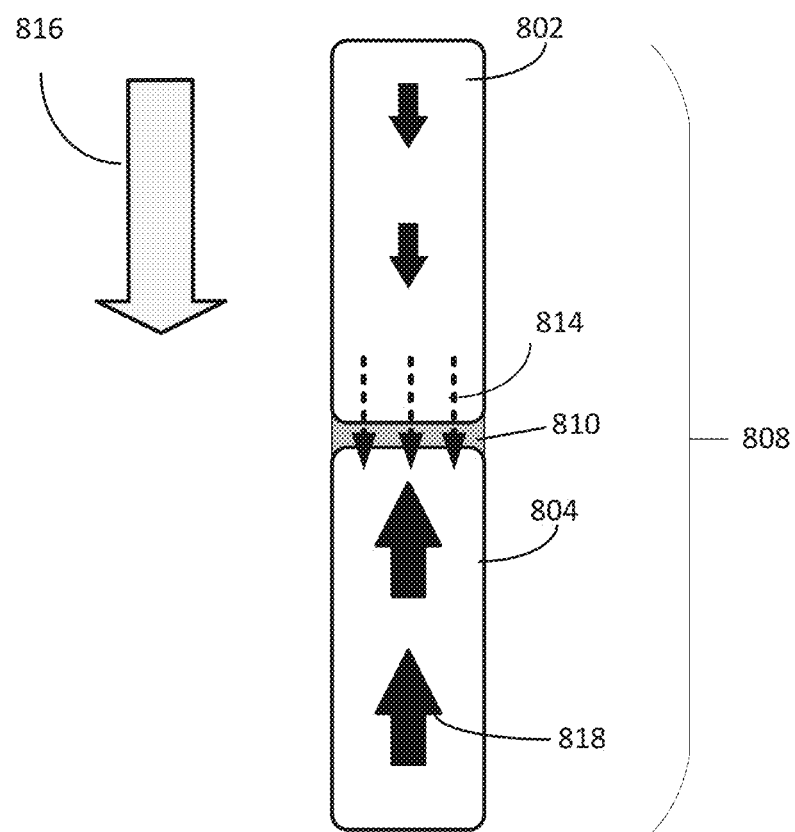
FIG. 8 is an illustration of a single magnetic grain in a HAMR device including dual layer recording media during a recording process of a zero-state grain.

FIG. 8 is an illustration of a single magnetic grain in a HAMR device including dual layer recording media during a recording process of a zero-state grain. The HAMR device includes a recording head with a heat element that heats a magnetic media according to a thermal profile that moves along a data track during a write process. FIG. 8 illustrates magnetic media 808 with dual recording layers including high Tc layer 804 and low Tc layer 802, break layer 810, magnetostatic interaction field 814, applied magnetic field 816 and magnetization state 818. Magnetostatic interaction field 814 is formed in response to applied magnetic field 816. FIG. 8 illustrates each of high Tc layer 804 and low Tc layer 802 having approximately the same thickness. In some scenarios, high Tc layer 804 may be thicker than low Tc layer 802 and in other scenarios, high Tc layer 804 may be thinner than low Tc layer 802.

In the example of FIG. 8, high Tc layer 804 is just below the recording temperature, and magnetization state 818 is "freezing in" in the direction of a previously applied write field (e.g., in a positive direction). Low Tc layer 802 is in the process of switching to the direction of now applied magnetic field 816. As applied magnetic field 816 is switched to the negative direction, magnetostatic interaction field 814 from low Tc layer 802 opposes magnetization state 818 of high Tc layer 804 near break layer 810. Because high Tc layer 804 is still in the process of "freezing in" (since the media temperature is just below the recording temperature of high Tc layer 804) magnetostatic interaction field 814 may destabilize high Tc layer 804 and cause it to switch to the same direction as low Tc layer 802 (e.g., to a negative direction). This could prevent formation of the stable zero-state grain.

Figure 9:
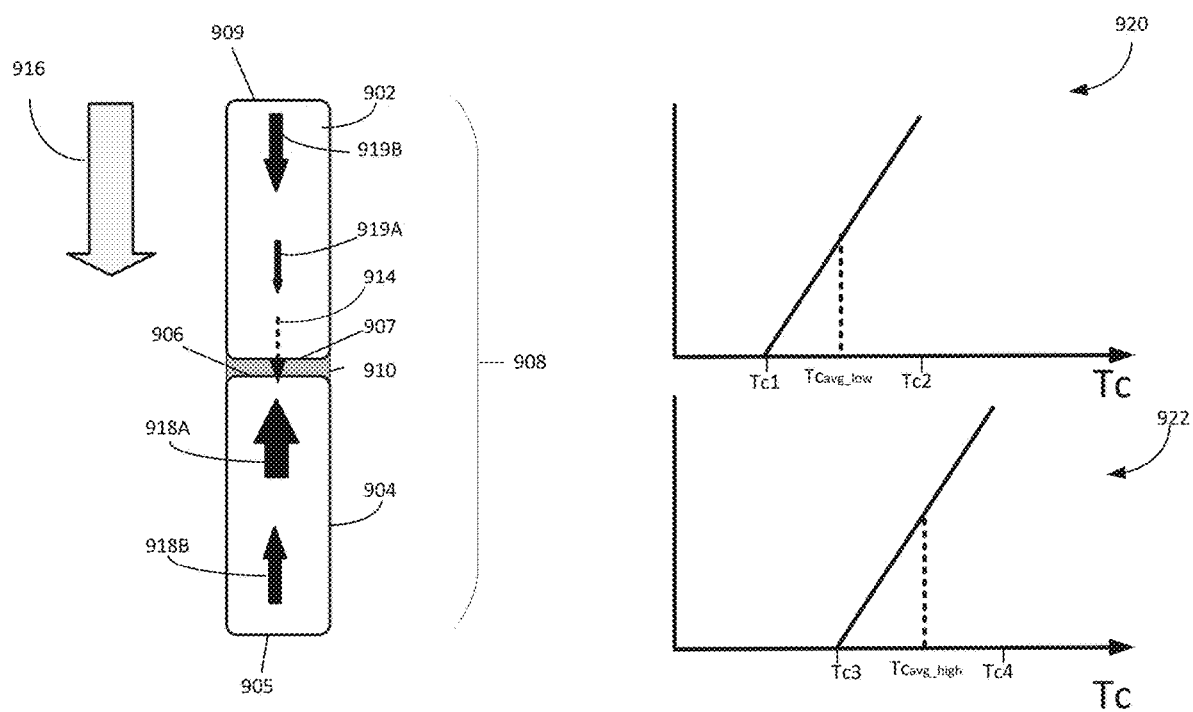
FIG. 9 illustrates a single magnetic grain in a in a HAMR device including dual layer recording media during a recording process of a zero-state grain where a magnetostatic interaction field is minimized.

FIG. 9 illustrates a single magnetic grain in a in a HAMR device including dual layer recording media during a recording process of a zero-state grain where the magnetostatic interaction field is minimized. The HAMR device includes a recording head with a heat element that heats a magnetic media according to a thermal profile that moves along a data track during a write process. FIG. 9 illustrates dual layer recording media 908 including average high Tc layer 904, average low Tc layer 902, break layer 910, magnetostatic interaction field 914, applied magnetic field 916 and magnetization states 918A, 918B, 919A, and 919B. In some examples, a capping layer (not shown) may be disposed on average low Tc layer 902.

Magnetostatic interaction field 914 is formed due to the upper layer magnetization switching in the down direction in response to applied magnetic field 916. Average high Tc layer 904 includes a first surface 906 and a second surface 905. First surface 906 is at break layer 910. Average low Tc layer 902 also includes a first surface 907 and a second surface 909. First surface 907 interface resides next to break layer 910. High Tc layer 904 has average Curie temperature $Tc_{avg\_high}$ and low Tc layer 902 has average Curie temperature $Tc_{avg\_low}$, as shown in plots 922 and 920, respectively. The temperature delta between $Tc_{avg\_low}$ and $Tc_{avg\_high}$ is between about 10 C and about 100 C.

In the scenario described in FIG. 9, each of average high Tc layer 904 and average low Tc layer 902 comprise a gradient in Curie temperature. Plots 920 and 922 represent example positive Curie temperature gradients in average low Tc layer 902 and average high Tc layer 904, respectively. In the example of plot 920, average low Tc layer 902 has a temperature range of Tc1 at a first surface 907 to Tc2 at a second surface 909. Average high Tc layer 904 has a temperature range of Tc3 at a second surface 905 to Tc4 at a first surface 906. In the example of FIG. 9, Tc4 is greater than Tc3 and Tc2 is greater than Tc1. Said another way, average low Tc layer 902 has a higher Curie temperature at second surface 909 and a lower Curie temperature at first surface 907. Average high Tc layer 904 has a higher Curie temperature at first surface 906 and a lower Curie temperature at second surface 905.

FIG. 9 illustrates a snapshot in time just after applied magnetic field 916 is switched from an initial positive up direction to the down direction and the grain temperature is just below the recording temperature of the of high Tc layer 904. Therefore, the temperature, and magnetization states 918A and 918B are "freezing in" in the direction of a previously applied write field (e.g., in a positive direction). In the scenario and snapshot in time illustrated in FIG. 9, because Tc4 is higher than Tc3, magnetization state 918A will have a larger magnetization moment than magnetization state 918B since 918A recording temperature is larger and more "frozen in" than the lower magnetization state 918B which is just above the current grain temperature.

In the example of FIG. 9, the Low Tc layer 902 is in the process of switching to the direction of now applied magnetic field 916. In the example illustrated in FIG. 9, because Tc2 is higher than Tc1, magnetization state 919B "freezes in" at a higher temperature than magnetization state 919A. As applied magnetic field 916 is switched to the negative direction, magnetostatic interaction field 914 from low Tc layer 902 opposes magnetization state 918A and 919B of high Tc layer 904 near break layer 910.

Including a Curie temperature gradient in each of average high Tc layer 904 and average low Tc layer 902 may assist in reducing magnetostatic interaction field 914 which may subsequently reduce the demagnetizing effect of magnetostatic interaction field 914. Reducing the demagnetizing effect of magnetostatic interaction field 914 reduces the likelihood that magnetization states 918A and 918B will switch back to the negative direction. This may subsequently assist in forming a more stable zero-state grain The manner in which magnetostatic interaction field 914 is reduced may be explained by considering the Curie temperature at surface 906 of average high Tc layer 904 and the Curie temperature at surface 907 of average low Tc layer 902 (Tc4 and Tc1, respectively). In the example of FIG. 9, average low Tc layer 902 is on top of average high Tc layer 904. Low Tc layer 902 has a lower Curie temperature (Tc1) at surface 907. In contrast, high Tc layer 904 has a higher Curie temperature (Tc4) at surface 906. During zero-state grain recording, average high Tc layer 904 is set in the positive magnetization direction. Because of the Curie temperature gradient, high Tc layer 904 has high anisotropy magnetization state 918A close to surface 906 and break layer 910. In contrast, low Tc layer 902 has low anisotropy magnetization state 919A close to surface 907 and break layer 910, due to the graded Curie temperature within the layer. So, low Tc layer 902 generates a weak moment at surface 907 and high Tc layer 904 is difficult to demagnetize at surface 907 due the relatively high anisotropy magnetization state 918A there. Because of this, magnetostatic interaction field 914 is weak and thus, average high Tc layer 904 is not easily destabilized. This lack of destabilization of average high Tc layer 904 may lead to an improvement in formation of a stable zero-state grain and a subsequent improvement in SNR.

Figure 10:
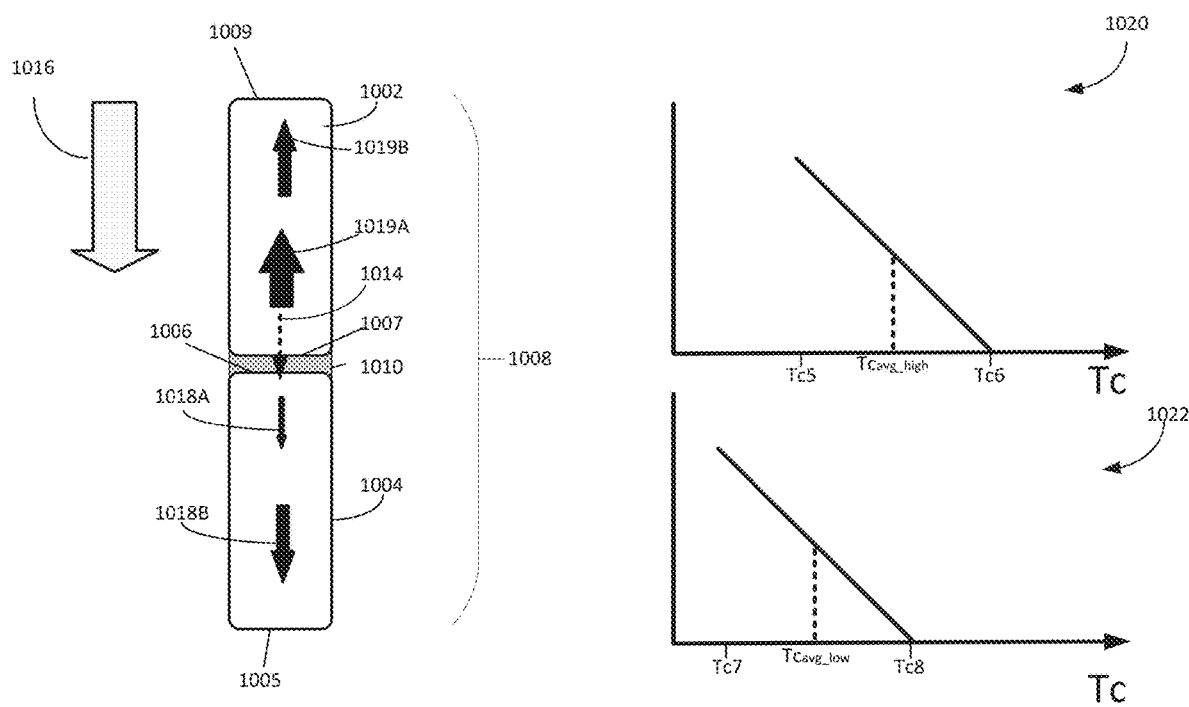
FIG. 10 illustrates a single magnetic grain in a in a HAMR device including dual layer recording media during a recording process of a zero-state grain where a magnetostatic interaction field is minimized.

FIG. 10 illustrates a single magnetic grain in a in a HAMR device including dual layer recording media during a recording process of a zero-state grain where the magnetostatic interaction field is minimized. The HAMR device includes a recording head with a heat element that heats a magnetic media according to a thermal profile that moves along a data track during a write process. FIG. 10 illustrates dual layer recording media 1008 comprising average high Tc layer 904, average low Tc layer 1004, break layer 1010, magnetostatic interaction field 1014, applied magnetic field 1016 and magnetization states 1018A, 1018B, 1019A, and 1019B. Magnetostatic interaction field 1014 is formed in response to applied magnetic field 1016. Average high Tc layer 1002 includes a first surface 1007 and a second surface 1009. First surface 1007 is at break layer 1010. Average low Tc layer 1004 also includes a first surface 1006 and a second surface 1005. First surface 1006 is at break layer 1010. High Tc layer 1002 has average Curie temperature $Tc_{avg\_high}$ and low Tc layer 1004 has average Curie temperature $Tc_{avg\_low}$, as shown in plots 1020 and 1022, respectively. The temperature delta between $Tc_{avg\_low}$ and $Tc_{avg\_high}$ is between about 10 C and about 100 C.

In the scenario described in FIG. 10, each of average high Tc layer 1002 and average low Tc layer 1004 comprise a gradient in Curie temperature. Plots 1022 and 1020 represent example negative Curie temperature gradients in average low Tc layer 1004 and average high Tc layer 1002, respectively. In the example of plot 1022, average low Tc layer 1004 has a temperature range of Tc7 at a first surface 1006 to Tc8 at a second surface 1005. Average high Tc layer 1002 has a temperature range of Tc5 at a second surface 1009 to Tc6 at a first surface 1007. In the example of FIG. 10, Tc8 is greater than Tc7 and Tc6 is greater than Tc5. Said another way, average low Tc layer 1004 has a higher Curie temperature at second surface 1005 and a lower Curie temperature at first surface 1006. Average high Tc layer 1002 has a higher Curie temperature at first surface 1007 and a lower Curie temperature at second surface 1009.

FIG. 10 illustrates a snapshot in time just after applied magnetic field 1016 is switched from an initial positive up direction to the down direction and the grain temperature is just below the recording temperature of high Tc layer 1002. Therefore, the temperature, and magnetization states 1019A and 1019B are "freezing in" in the direction of a previously applied write field (e.g., in a positive direction). In the scenario and snapshot in time illustrated in FIG. 10, because Tc6 is greater than Tc5, magnetization state 1019A will have a larger magnetization moment than magnetization state 1019B since magnetization state 1019A recording temperature is larger and magnetization state 1019A is more "frozen in" than the lower magnetization state 1019B, which is just above the current grain temperature.

In the example of FIG. 10, low Tc layer 1004 is in the process of switching to the direction of now applied magnetic field 1016. In the example illustrated in FIG. 10, because Tc8 is higher than Tc7, magnetization state 1018B "freezes in" at a higher temperature than magnetization state 1018A. As applied magnetic field 1016 is switched to the negative direction, magnetostatic interaction field 1014 from low Tc layer 1004 opposes magnetization state 1019A and 1019B of high Tc layer 1002 near break layer 1010.

Including a Curie temperature gradient in each of average high Tc layer 1002 and average low Tc layer 1004 may assist in reducing magnetostatic interaction field 1014 which may subsequently reduce the demagnetizing effect of magnetostatic interaction field 1014. Reducing the demagnetization effect of magnetostatic interaction field 1014 reduces the likelihood that magnetization states 1019A and 1019B will switch back to the negative direction. This may subsequently assist in forming a more stable zero-state grain.

The manner in which magnetostatic interaction field 1014 is reduced may be explained by considering the Curie temperature at surface 1007 of average high Tc layer 1002 and the Curie temperature at surface 1006 of average low Tc layer 1004 (Tc6 and Tc7, respectively). In the example of FIG. 10, average high Tc layer 1002 is on top of average low Tc layer 1004. Low Tc layer 1004 has a lower Curie temperature (Tc7) at surface 1006. In contrast, high Tc layer 1002 has a higher Curie temperature (Tc6) at surface 1007. During zero-state grain recording, average high Tc layer 1002 is set in the positive magnetization direction. Because of the Curie temperature gradient, high Tc layer 1002 has high anisotropy magnetization state 1019A close to surface 1007 and break layer 1010. In contrast, low Tc layer 1004 has low anisotropy magnetization 1018A close to surface 1006 and break layer 1010, due to the graded Curie temperature within the layer. So, low Tc layer 1004 generates a weak moment at surface 1006 and high Tc layer 1002 is difficult to demagnetize at surface 1007 due the relatively high anisotropy magnetization state 1019A there. Because of this, magnetostatic interaction field 1014 is weak and thus, average high Tc layer 1002 is not easily destabilized. This lack of destabilization of average high Tc layer 1002 may lead to an improvement in formation of a stable zero-state grain and a subsequent improvement in SNR.

Various examples have been presented for the purpose of illustration and description. These and other examples are within the scope of the following claims.

What is claimed is:

1. An apparatus comprising:
   a first magnetic layer having a first surface and second surface;
   a second magnetic layer having a third surface and a fourth surface;
   a break layer between the first surface of the first magnetic layer and the third surface of the second magnetic layer;
   wherein the first magnetic layer has a first Curie temperature that varies between the first surface and the second surface to define a first average Curie temperature and a first Curie temperature gradient;
   wherein the second magnetic layer has a second Curie temperature that varies between the third surface and the fourth surface to define a second average Curie temperature and a second Curie temperature gradient;
   wherein the first average Curie temperature is higher than the second average Curie temperature; and
   wherein the first Curie temperature at the first surface of the first magnetic layer is higher than the second Curie temperature at the third surface of the second magnetic layer.

2. The apparatus of claim 1, wherein the first magnetic layer is adjacent to the second magnetic layer.

3. The apparatus of claim 2, wherein the first Curie temperature gradient of the first magnetic layer is a first negative Curie temperature gradient, and the second Curie temperature gradient of the second magnetic layer is a second negative Curie temperature gradient.

4. The apparatus of claim 2, wherein the first Curie temperature gradient of the first magnetic layer is a first positive Curie temperature gradient, and the second Curie temperature gradient of the second magnetic layer is a second positive Curie temperature gradient.

5. The apparatus of claim 1, wherein a magnetostatic interaction field is formed between the first magnetic layer and the second magnetic layer in response to an applied magnetic field.

6. The apparatus of claim 1, wherein a temperature delta between the first average Curie temperature of the first magnetic layer and the second average Curie temperature of the second magnetic layer is between about 10 C and about 100 C.

7. The apparatus of claim 1, wherein the first magnetic layer is a recording layer.

8. The apparatus of claim 1, wherein the second magnetic layer is a recording layer.

9. The apparatus of claim 1, wherein the first magnetic layer, the second magnetic layer and the break layer form a magnetic stack.

10. The apparatus of claim 9, wherein a cap layer is disposed on the magnetic stack.

11. The apparatus of claim 9, wherein the magnetic stack is formed adjacent to a heat sink layer.

12. The apparatus of claim 11, wherein the heat sink induces a thermal profile in the magnetic stack.

13. A heat-assisted magnetic recording (HAMR) device comprising;
   a recording head with a heat element that heats a magnetic media according to a thermal profile that moves along a data track during a write process;
   a magnetic media comprising;
   a first magnetic layer having a first surface and second surface;
   a second magnetic layer having a third surface and a fourth surface;
   a break layer between the first surface of the first magnetic layer and the third surface of the second magnetic layer;

wherein the first magnetic layer has a first Curie temperature that varies between the first surface and the second surface to define a first average Curie temperature and a first Curie temperature gradient;

wherein the second magnetic layer has a second Curie temperature that varies between the third surface and the fourth surface to define a second average Curie temperature and a second Curie temperature gradient;

wherein the first average Curie temperature is higher than the second average Curie temperature; and wherein the first Curie temperature at the first surface of the first magnetic layer is higher than the second Curie temperature at the third surface of the second magnetic layer.

14. The HAMR device of claim 13, wherein the first magnetic layer is adjacent to the second magnetic layer.

15. The HAMR device of claim 14, wherein the first Curie temperature gradient of the first magnetic layer is a first negative Curie temperature gradient, and the second Curie temperature gradient of the second magnetic layer is a second negative Curie temperature gradient.

16. The HAMR device of claim 14, wherein the first Curie temperature gradient of the first magnetic layer is a first positive Curie temperature gradient, and the second Curie temperature gradient of the second magnetic layer is a second positive Curie temperature gradient.

17. The HAMR device of claim 13, wherein a magnetostatic interaction field is formed between the first magnetic layer and the second magnetic layer in response to an applied magnetic field.

18. The HAMR device of claim 13, wherein the thermal profile includes a higher temperature zone and a lower temperature zone.

19. The HAMR device of claim 18, wherein the first magnetic layer has magnetic characteristics that facilitate magnetic reversals when heated to a first recording temperature within a higher temperature zone of the thermal profile but not when heated to a second recording temperature within a lower temperature zone of the thermal profile; and wherein the second magnetic layer has magnetic characteristics that facilitate magnetic reversals when heated to either the first recording temperature or the second recording temperature.

20. A data storage device comprising;

a recording head with a heat element that heats a magnetic media according to a thermal profile that moves along a data track during a write process;

a magnetic media comprising;

a first magnetic layer having a first surface and second surface;

a second magnetic layer having a third surface and a fourth surface;

a break layer between the first surface of the first magnetic layer and the third surface of the second magnetic layer;

wherein the first magnetic layer has a first Curie temperature that varies between the first surface and the second surface to define a first average Curie temperature and a first Curie temperature gradient;

wherein the second magnetic layer has a second Curie temperature that varies between the third surface and the fourth surface to define a second average Curie temperature and a second Curie temperature gradient;

wherein the first average Curie temperature is higher than the second average Curie temperature; and wherein the first Curie temperature at the first surface of the first magnetic layer is higher than the second Curie temperature at the third surface of the second magnetic layer.

* * * * *